March 12, 1968 M. E. GERTON Re. 26,362
CATALYZED GYPSUM WALLBOARD AND METHOD OF PRODUCTION THEREOF
Original Filed Dec. 6, 1962
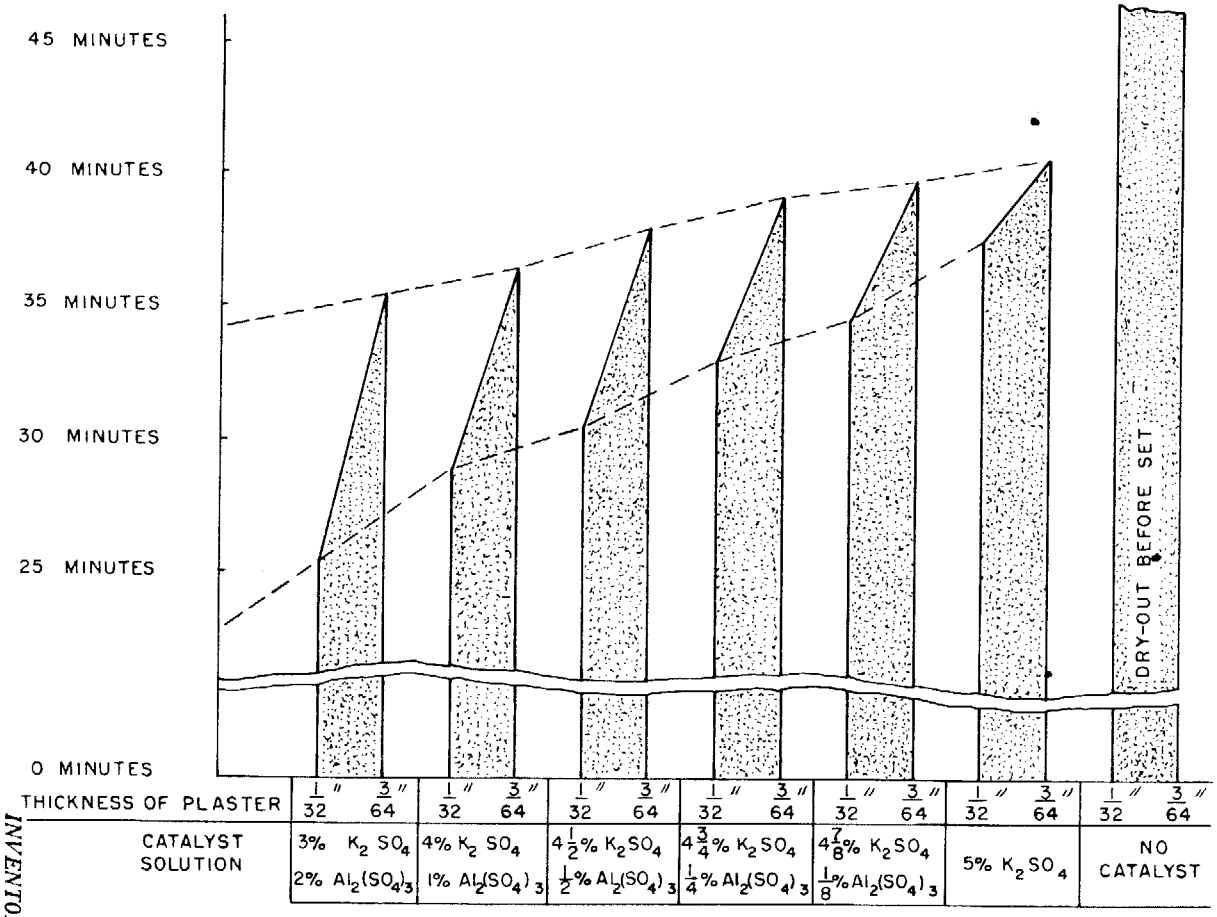
INVENTOR.
MARK E. GERTON
BY
Fryer and Tjensvold
ATTORNEYS United States Patent Office Re. 26,362
Reissued Mar. 12, 1968

26,362

CATALYZED GYPSUM WALLBOARD AND METHOD OF PRODUCTION THEREOF

Mark E. Gerton, Pleasanton, Calif., assignor to Fibreboard Corporation, a corporation of Delaware Original No. 3,284,227, dated Nov. 8, 1966, Ser. No. 242,806, Dec. 6, 1962. Application for reissue June 22, 1967, Ser. No. 653,589

5 Claims. (Cl. 117—60)

Matter enclosed in heavy brackets [ ] appears in the original patent but forms no part of this reissue specification; matter printed in italics indicates the additions made by reissue.

The present invention relates to compositions and improvements to dry wall and plaster construction and more particularly to catalyzed gypsum lath and to a thin one-coat gypsum surface therefor.

More specifically, the present invention is directed to a process for interior wall construction where gypsum wallboard or similar material is utilized as the wall base having a gypsum setting catalyst applied to its surface and a special thin coat of gypsum plaster is applied to the wall base to form a finished wall surface.

The use of thin gypsum plaster coatings on gypsum wallboard or lath provides many advantages not previously found in conventional construction. More specifically, the thin overall gypsum plaster coat provides a harder surface that is much less porous than conventional plaster construction. Thus the harder, denser, thin coat is more flame resistant and more sanitary than conventional plaster or dry wall surfaces. In addition, much less shrinkage occurs, whereby splitting and cracking of the plaster surface is greatly reduced. The use of a single thin coat also considerably reduces the total amount of material needed to finish the wall whereby great economies are realized. In addition, the thin gypsum plaster coat is applied in one operation, whereby labor costs are also greatly reduced. Finally, the construction of the invention provides a plaster surface coat which is more easily worked to obtain the finished surface and also provides an extremely tenacious bond between the gypsum plaster coat and the wallboard backing.

While such thin wall coatings have been generally recognized as being desirable, achieving such a construction has been very difficult. The major problem in this respect is that thin plaster coatings placed upon conventional wallboard backing are subject to the defect known as "dry-out." "Dry-out" is the term applied to defective plaster wall construction wherein the water in the plaster coating is absorbed into the wall backing before the plaster has set. Water is absolutely essential to the setting of gypsum plasters; and if the water in the plaster is absorbed into the backing before the plaster can set, then the resultant coating becomes soft and powdery. In addition, the bond of the plaster coating to the backing is very poor. Thin plaster coatings are particularly susceptible to "dry-out." This is so, because the water in the applied plaster formulation can be quickly evaporated and/or absorbed into the wallboard backing before the plaster has a chance to set, whereby a "dry-out" occurs.

The present invention solves the "dry-out" problem and in addition, as noted supra, produces a hard, dense adherent one-coat gypsum plaster surface on the wall. This is accomplished by specially preparing the wallboard backing during manufacture. More specifically, a catalyst is applied to the surface of the wallboard backing. This catalyst accelerates the setting time of the gypsum plaster applied thereto; however the setting migrates from the wallboard backing surface through the plaster to the exterior. This rate of "setting" migration can be regulated by a proper selection of the accelerating agent. By such means, the gypsum plaster sets initially at the plaster wallboard backing interface, whereby a strong tenacious bond is achieved. Although the gypsum plaster interface has already set, a period of time elapses before the setting zone migrates to the plaster surface. A desirable consequence of this fact is that the exterior plaster surface may be worked to achieve the desired appearance even though the plaster-wallboard interface has already set to form a strong bond. Therefore, any desired exterior surface finish can be achieved.

In addition to the catalyst treated wallboard backing, the present invention contemplates the use of a gypsum plaster composition which sets to a hard, dense, nonshrinking coating most desired for such construction and which may also be successfully applied to the backing in a very thin coat.

It is therefore an object of the invention to provide a wall having a thin, one-coat plaster surface.

It is a further object of the invention to provide a plaster surfaced wall having a hard, dense surface.

It is yet another object of the invention to provide a thin coat plaster wall construction that is free from "dry-out" problems.

It is still another object of the invention to provide a wallboard backing, having a gypsum plaster catalyst applied to the exterior surface thereof.

It is yet another object of the invention to provide a gypsum plaster composition which can be applied in a thin coat to a catalyzed wallboard backing yet which provides a finished coating essentially free from checks and cracks.

Other advantages of the invention will become apparent upon reference to the subsequent specification and claims as well as to the drawing appended hereto wherein:

The single figure is a graph illustrating the setting time of thin coats of gypsum plaster as influenced by catalytic agents of varying composition placed upon the wallboard backing.

The construction of the present invention comprises a conventional wallboard or lath nailed or affixed by suitable means to the wall studding. The wallboard or lath will generally be of the paper surfaced, gypsum-core type or of a compressed fibreboard material suitable for use as plaster backing. The wallboard or backing of the present invention differs from that conventionally found in the art in that a suitable catalytic agent has been impregnated into the outer surface thereof. The composition of this catalytic agent is critical to the invention construction. Thus, it has been found that a catalytic agent comprising either potassium sulphate or mixtures of potassium sulphate and aluminum sulphate are particularly suitable for the catalytic agent. While potassium sulphate alone may be used, best results are obtained with mixtures of potassium and aluminum sulphate. Thus, on a dry basis, the catalyst may comprise 100–60 parts by weight of potassium sulphate and 0–40 parts by weight of aluminum sulphate.

Generally, for convenience, the catalyst mixture is applied to the wallboard during the manufacturing process. However, under certain circumstances, the catalyst may be applied to the wallboard at any time subsequent to the manufacture thereof and prior to the plastering operation. In any event, the catalyst is most conveniently applied to the wallboard in the form of an aqueous solution. Advantageously, a small amount of wetting agent such as sodium carbonate or others well-known in the art may be included in the solution of the catalyst or may be applied separately to the surface of the wallboard in order to condition it so that the solution of the catalyst will uniformly wet the wallboard. The aqueous solution of the catalyst is applied in a concentration of at least 2 percent up to saturated (approximately 7–8 percent).

The catalytic solution is applied to the wallboard at a rate of about 0.3 to 1.0 lb. per thousand square feet of wallboard surface (dry weight of catalyst). As an illustration, wallboard according to the present invention has been produced using about 0.43 lb. of catalyst on a "dry-weight" basis per 1,000 sq. ft. of wallboard surface. It should be further noted that the catalyst solution should be a true solution and not a slurry since a slurry would deposit too much catalyst on the surface of the wallboard.

The catalyst solution is applied to the wallboard by any convenient means, such as by roller, brushing, spraying or by doctor blade. In any event, the catalyst composed of potassium sulphate alone or more preferably of a mixture of potassium sulphate and aluminum sulphate is applied to the wallboard surface at some time prior to the plastering operation.

The catalyst applied to the surface of the wallboard base solves the "dry-out" problem by accelerating the set of the gypsum plaster coating. Thus, the catalyst causes the gypsum plaster coating to set fairly rapidly, with the set commencing adjacent the wallboard backing and migrating slowly toward the surface of the gypsum plaster.

As a result, the gypsum plaster adheres firmly to the wallboard and yet the outer surface can be worked for a reasonable length of time. In this respect, it should be noted that the aluminum sulphate in the catalyst increases the rate of setting of the gypsum plaster. Generally, however, it should not be used in combination with potassium sulphate in any higher a proportion than stated hereinbefore. Thus, too much aluminum sulphate would reduce the rate of water absorption into the wallboard backing.

It is not desirable to completely prevent the water in the mixture from penetrating into the wallboard, since the best finishes are obtained by troweling the moist surface on the loss of water when its stiffening is not entirely due to the set alone. When troweling is accomplished as the water is used up or penetrates into the board, the resultant smooth surface will remain smooth as it sets from the inside. But if too much water remains in the gypsum plaster, it is difficult to trowel smooth exactly at the time of the setting of the plaster. The loss of water into the wallboard backing is not harmful and it does not cause "dry-out" when the catalyst is applied to the board in accordance with this invention.

Tests were made to determine the effect of varying proportions of catalyst upon the setting time of gypsum plaster. The drawing presented herewith illustrates the fact that higher proportions of aluminum sulphate added to potassium sulphate decrease the setting time of the gypsum plaster. The drawing also illustrates how the catalyst reduces the setting time of the gypsum plaster with relation to uncatalyzed plasters. In fact, it should be noted that the gypsum plaster formulation utilized in the chart had a set of one hundred minutes when uncatalyzed.

The final element of the wall construction of the present invention is a thin coat of gypsum plaster applied to the catalyzed wallboard backing previously discussed. This gypsum plaster is a one-coat layer which can be applied by troweling, spraying or other suitable means. In any event, the gypsum plaster coating is ideally kept very thin, preferably on the order of 1/16" or less.

The thin gypsum plaster coating, which is applied to the catalyst-treated lath has the following composition:

60–80 percent by weight gypsum
15–30 percent by weight inert filler, such as sand, perlite, shale, vermiculite, crushed marble or other similar materials
2–10 percent of a clay such as fire clay or china clay
0.5–2 percent of a mixture of polyvinyl acetate and polyvinyl alcohol.

The proportions of materials set forth above are very important to the properties of the gypsum plaster composition. Specifically, if less than 60 percent of gypsum is used in the composition, the thin coat when applied to the wallboard backing will not have enough strength. On the other hand, if more than 80 percent is used, there will not be enough aggregate to provide a strong, crack-free finish.

Similar restrictions apply to the percentage of inert filler used in the gypsum plaster composition. The filler, regardless of whether it is sand, perlite or any other similar material, should be less than 20 mesh as measured on the U.S. Sieve series. In addition, if less than 15 percent inert filler is used, the thin gypsum coat tends to develop crazing and cracking in the finish. On the other hand, if more than 30 percent of the inert filler is used, the thin coat cannot be troweled to a smooth finish.

Clay in the gypsum plaster composition is necessary to provide plasticity for improved troweling properties when the surface is finished. If less than 2 percent of clay is used it is difficult to obtain the desired plasticity in the thin coat. On the other hand, if more than 10 percent of the clay is used, the final surface is not as hard as it should be. In this respect, it should be noted that fire clay is preferred in the composition, since it develops the above-noted properties in the gypsum composition to a greater extent than does china clay. However, china clay is still a perfectly acceptable material for use in the composition.

The mixture of polyvinyl acetate and polyvinyl alcohol in the quantities noted, supra, is extremely important to the gypsum plaster composition. The presence of polyvinyl acetate and polyvinyl alcohol in the composition imparts greatly improved toughness to the thin coat surface as well as partially retarding the final drying thereof. It is believed that final drying is retarded due to the formation of a film of the vinyl compositions on the surface of the thin coat gypsum plaster. Whether that is the specific mechanism by which the vinyl materials retard the final drying or not, it has been observed that they are specifically useful in this respect in the plaster composition.

If less than 0.5 percent of the polyvinyl mixture is used in the plaster composition, the toughness properties imparted to the thin coat are lost. On the other hand, if more than 2 percent of the combined polyvinyl materials is included in the composition, the gypsum plaster mixture is difficult to trowel and work when applied to the wallboard backing. Both polyvinyl acetate and polyvinyl alcohol should be employed in the thin coat gypsum plaster mixture. The proportion of polyvinyl acetate to polyvinyl alcohol may vary from about 1–2 to 2–1. Preferably, the composition should contain 4 parts by weight of polyvinyl acetate to 3 parts by weight of polyvinyl alcohol. These ratios are the proportions of polyvinyl acetate to polyvinyl alcohol within the 0.5–2 percent combined limits previously set forth.

When desired, hydrated lime in the amount of from 0.25 to 2 percent by weight of the plaster mixture may be included. The lime balances the plasticity and reduces the tendency of nails and metal accessories to rust. Lime in excess of 2 percent weakens the compressive strength of the plaster coat.

Under certain conditions, it is desirable to include a retarder in the gypsum plaster composition. Such retarders may be sodium citrate, citric acid, phosphates or any keratin product. The presence of the retarder in the gypsum plaster mixture increases the working life of the plaster. For instance, when sodium citrate retarder is added in the amount of about 0.1 percent by weight in the gypsum plaster mixture, the working life is increased several times over that of the life of the plaster without the retarder therein. Thus, the plaster surface may be troweled smooth over a longer period of time. Due to the presence of the catalyst on the wallboard backing, while the surface is being troweled smooth, the plaster begins to set at the wallboard interface and the strong bond created holds the gypsum plaster on the wallboard backing securely while the outer surface is still workable. Where it is found desirable to increase the working life of the applied thin plaster coat, retarder materials as noted above may be added to the dry plastic composition in amounts not greater than 0.1 percent by weight.

In applying the gypsum plaster to the catalyzed wallboard backing, the dry composition is mixed with sufficient water to form a semisolid composition which can be applied in the usual manner. Such semisolid composition may be applied to the backing by hand or may be mixed with a greater amount of water to have a consistency suitable for spray coating onto the backing. As previously noted, the gypsum plaster is applied to the backing in thin coats preferably of 1/16" thickness or less. Such thin coats provide a tough, hard, generally impervious surface over the wallboard backing in a single coat. The coating can be decorated by painting or another suitable manner in twenty-four hours.

The thin coat gypsum plaster, catalyzed wallboard construction of the present invention is entirely suitable for use wherever conventional lath and plaster or other dry wall systems find application.

What is claimed is:

1. A method of wall construction comprising impregnating the surface of a wallboard backing with an aqueous solution of a gypsum setting catalytic agent selected from the group consisting of potassium sulphate and mixtures of potassium sulphate and aluminum sulphate, and plastering a single thin coat of gypsum plaster comprising about 15 to 30 percent inert filler, about 2 to 10 percent plasticizer clay, about 0.5 to 2% of a mixture of polyvinyl acetate and polyvinyl alcohol, and the remainder consisting essentially of gypsum, upon the catalyzed surface of said backing, and final-finishing the thin plaster coat to form a continuous plaster exterior surface.

2. The method of claim 1 wherein the concentration of the catalytic agent in the aqueous solution is between about 2 to 8 percent by weight and wherein the aqueous solution is applied to the backing at the rate of between about 0.3 to 1 pound on a dry basis of catalyst per 1,000 square feet of backing surface.

3 The method of claim 1 wherein said thin plaster coat is applied on said wallboard backing to a thickness of about 1/16 inch.

4. A wall construction comprising a wallboard backing, a gypsum setting catalyst selected from the group consisting of potassium sulphate and mixtures of potassium sulphate and aluminum sulphate impregnated in the surface of said backing, and a continuous thin single coating of gypsum plaster comprising about 15 to 30 percent inert filler, about 2 to 10 percent plasticizer clay, about 0.5 to 2 percent of a mixture of polyvinyl acetate and polyvinyl alcohol, and the remainder consisting essentially of gypsum, adhered to the exterior surface of said backing.

5. A wallboard backing for use with a thin one coat gypsum plaster surface comprising a core material and a fibrous surface material, and a gypsum setting catalyst comprising a mixture of from about [1:2 to 2:1] *3:2 to 39:1* parts by weight of potassium sulfate to aluminum sulfate applied to said backing in the amount of about 0.3 to 1 pound of catalyst per one thousand square feet of backing surface.

References Cited

The following references, cited by the Examiner, are of record in the patented file of this patent or the original patent.

UNITED STATES PATENTS

| | | | |
|---|---|---|---|
| 2,015,676 | 10/1935 | Heiser | 106—110 |
| 2,083,321 | 6/1937 | Dunn et al. | 106—111 |
| 2,113,375 | 4/1938 | Himsworth et al. | 106—111 |
| 2,191,555 | 2/1940 | Berliner | 106—111 |
| 2,197,566 | 4/1940 | Denning | 106—111 |
| 2,206,042 | 7/1940 | Novak | 156—39 |
| 2,318,540 | 5/1943 | Talbert | 106—111 |
| 2,460,266 | 2/1949 | Haddon | 106—315 |
| 2,508,600 | 5/1950 | Fitzsimmons | 106—111 |
| 2,557,083 | 6/1951 | Ebert | 106—111 |
| 2,605,191 | 7/1952 | Ingram et al. | 106—111 |
| 2,644,771 | 7/1953 | Kempthorne | 117—70 |
| 2,655,148 | 10/1953 | Eberl et al. | 117—169 |
| 2,711,377 | 6/1955 | Riddell | 117—169 |
| 2,776,234 | 1/1957 | Riddell et al. | 117—152 |
| 2,820,714 | 6/1958 | Schneiter | 106—11 |
| 2,842,120 | 7/1958 | Foglia et al. | 106—111 |
| 2,842,138 | 7/1958 | Billings et al. | 106—111 |
| 2,940,505 | 6/1960 | Brothers | 156—39 |
| 2,976,173 | 3/1961 | Czerwin | 117—70 |
| 2,980,548 | 4/1961 | Hampton | 106—112 |
| 3,035,940 | 5/1962 | Hobson | 117—152 |
| 3,163,618 | 12/1964 | Nicol et al. | 161—250 |

WILLIAM D. MARTIN, *Primary Examiner.*

M. LUSIGNAN, *Assistant Examiner.*